United States Patent [19]

Ikejima

[11] Patent Number: 4,625,159
[45] Date of Patent: Nov. 25, 1986

[54] CONTROL APPARATUS FOR ELEVATOR

[75] Inventor: Hiroyuki Ikejima, Inazawa, Japan

[73] Assignee: Mitsubishi Denki Kabushiki Kaisha, Tokyo, Japan

[21] Appl. No.: 812,712

[22] Filed: Dec. 23, 1985

[30] Foreign Application Priority Data

Dec. 27, 1984 [JP] Japan .................. 59-276449

[51] Int. Cl.⁴ .............................................. H02P 5/34
[52] U.S. Cl. .................. 318/811; 187/29 R; 318/807
[58] Field of Search .................. 318/807–811, 318/763, 764; 187/29

[56] References Cited

U.S. PATENT DOCUMENTS

| 2,545,464 | 10/1965 | Nomura | 318/807 X |
| 4,262,241 | 4/1981 | Azusawa | 318/764 X |
| 4,437,051 | 3/1984 | Muto et al. | 318/811 X |
| 4,506,766 | 3/1985 | Watanabe | 318/801 X |
| 4,544,873 | 10/1985 | Salihi et al. | 318/801 |

FOREIGN PATENT DOCUMENTS 59-17879  1/1984  Japan .

Primary Examiner—B. Dobeck
Attorney, Agent, or Firm—Leydig, Voit & Mayer

[57] ABSTRACT

A voltage detector detects the terminal voltage of a smoothing capacitor which is disposed between a converter for generating direct current and an inverter for generating alternating current. The presence and magnitude of regenerative power to the converter is judged by the detecting operation, and when the terminal voltage of the smoothing capacitor has risen, a power control device decreases the slip of an induction motor in succession, whereby the regenerative power is suppressed to zero.

5 Claims, 4 Drawing Figures

CONTROL APPARATUS FOR ELEVATOR

BACKGROUND OF THE INVENTION

This invention relates to a control apparatus for an elevator which is driven by an induction motor.

There has been an elevator system wherein an induction motor is employed as an electric motor for driving a cage, and it is subjected to a slip frequency control, thereby to operate the cage with the torque of the motor controlled. FIG. 2 is a block diagram of an example of a prior-art control apparatus disclosed in the official gazette of Japanese Patent Application Laid-open No. 59-17879.

Referring to the figure, numeral 1 designates a three-phase A.C. power source terminal, and numeral 2 an electromagnetic contractor contact which is connected to the three-phase A.C. power source terminal and which closes at the start of a cage 9 to be described below and opens at the stop thereof. Numeral 3 indicates a converter by which a three-phase alternating current obtained through the electromagnetic contactor contact 2 is changed into direct current, numeral 4 a smoothing capacitor which is connected across the output terminals of the converter 3, and numeral 5 an inverter of the pulse width modulation system which is connected to both the terminals of the smoothing capacitor 4 and which changes a fixed D.C. voltage into alternating current of variable voltage and variable frequency. A three-phase induction motor (hereinbelow, termed 'induction motor') 6 is driven by the inverter 5, the drive sheave 7 of a hoist is driven by the induction motor 6, a main rope 8 is wound round the drive sheave 7, the cage 9 and a counterweight 10 are respectively coupled to both the ends of the main rope 8, and a tachometer generator 11 detects the revolution speed of the induction motor 6 to generate a speed signal 11a. An adder 13 subtracts the speed signal 11a from a speed command signal 12, and delivers a deviation signal. Connected to the adder 13 is a compensating element 14 which serves to improve the response of a speed control loop, which has a transfer function G(s) and which provides a slip frequency command signal 14a as its output. An adder 15 adds the slip frequency command signal 14a and the speed signal 11a. A voltage command generator 16 generates a voltage command signal 16a by receiving the output 15a of the adder 15, while a frequency command generator 17 generates a frequency command signal 17a similarly. A switching device 18 brings contact pieces 18a and 18b into touch with the sides of contacts a respectively when the slip frequency command signal 14a is plus or zero, and it brings them into touch with the sides of contacts b respectively when the slip frequency command signal 14a is minus. A gain changer 19 is connected to the contact b with which the contact piece 18a is switchedly brought into touch, and upon receiving the output 15a of the adder 15, it produces an output of a set value in accordance with the received value. A power control device 20 is connected to the contact b with which the contact piece 18b is switchedly brought into touch, and upon receiving the speed signal 11a, it produces a frequency command signal (fixed value) with which regenerative power to be regenerated from the induction motor 6 to the D.C. side becomes null. An inverter control device 21 controls the output voltage and output frequency of the inverter 5 on the basis of the voltage command signal 16a, the frequency command signal 17a, the output of the gain changer 19, and the frequency command signal of the power control device 20.

The prior-art control apparatus for the elevator is constructed as described above. Thus, during the power operation of the induction motor 6, the slip frequency command signal 14a which is evaluated with the deviation signal between the speed command signal 12 and the speed signal 11a is plus, so that the contact pieces 18a and 18b are respectively held in touch with the sides of the contacts a as shown in the figure. Accordingly, the slip frequency command signal 14a and the speed signal 11a are added by the adder 15, and the resulting output signal 15a is input to the voltage command generator 16 and the frequency command generator 17. In the voltage command generator 16 and the frequency command generator 17, the voltage command signal 16a and the frequency command signal 17a are respectively generated according to which the output voltage/output frequency satisfy a substantially fixed relationship. On the basis of these command signals, the inverter control device 21 controls switching elements constituting the inverter 5 and causes the induction motor 6 to generate a torque corresponding to the slip frequency command signal 14a.

Meanwhile, in the elevator, when the cage 9 is decelerated and stopped, mechanical energy is converted into electrical energy through the induction motor 6, and regenerative power is fed back to the D.C. side through the inverter 5. On this occasion, when the aforementioned control making the output voltage/output frequency substantially constant is performed, the regenerative energy is stored in the smoothing capacitor 4 to raise the terminal voltage thereof, and this capacitor 4 itself and the inverter 5 might be destroyed.

Therefore, in the mode of the regenerative operation of the induction motor 6, the switching device 18 switches the contact pieces 18a and 18b to the sides of the contacts b upon detecting that the slip frequency command signal 14a has become minus. Thus, the slip frequency command signal 14a is directly input to the gain changer 19, the output of which is applied to the inverter control device 21 as a voltage command signal. Besides, the power control device 20 receives the speed signal 11a as its input, and it creates a frequency command signal making the regenerative power null and applies this signal to the inverter control device 21. The expression 'control making the regenerative power null' signifies none other than consuming all the mechanical energy within the motor. The principle of the power control device 20 which generates the frequency command signal for this purpose will be described by referring also to the equivalent circuit of the induction motor shown in FIG. 3.

Referring to FIG. 3, electric power $P_1$ which is consumed within the induction motor 6 is given by:

$$P_1 = V^2 g_0 + r_1 \left(\frac{V}{Z}\right)^2 + r_2 \left(\frac{V}{Z}\right)^2 \quad (1)$$

where $$Z = \sqrt{(x_1 + x_2)^2 + (r_1 + r_2/s)^2} \quad (2)$$

Here,

V: A.C. input voltage,

Z: overall impedance of the induction motor 6,
$g_0$: excitation conductance,
$r_1$, $r_2$: primary resistance and secondary resistance (calculated into a primary value) of the induction motor 6,
$x_1$, $x_2$: primary leakage reactance and secondary leakage reactance (calculated into a primary value) of the induction motor 6,
s: slip of the induction motor 6.

On the other hand, electric power $P_2$ which is generated as regenerative power is given by:

$$P_2 = \left(\frac{V}{Z}\right)^2 \cdot \left(\frac{1-s}{s}\right) r_2 \tag{3}$$

Here, when the slip s is controlled so as to hold:

$$P_1 + P_2 = 0 \tag{4}$$

all the mechanical energy is consumed within the induction motor 6.

Substituting Eqs. (1) and (3) into Eq. (4), $$s = \frac{r_2}{r_1 + g_0 Z^2} \tag{5}$$

where $Z=Z(s)$ is put. By evaluating s which satisfies Eq. (5) without regard to the input voltage V, the slip s which gives rise to a braking force without the exchange of electric power is obtained. Further, when the speed signal 11a is given, the frequency command signal for the inverter 5 is determined. It is accordingly understood that only the speed signal 11a may be given to the power control device 20. Symbol $b_0$ in FIG. 3 denotes an excitation susceptance.

As thus far described, in the power operation mode of the induction motor, the prior-art control apparatus for the elevator as shown in FIG. 2 controls the torque with the slip frequency command signal corresponding to the deviation between the speed command signal and the speed signal, while in the regenerative braking mode, it controls the frequency command signal to be applied to the inverter, with the speed signal and makes the regenerative power of the induction motor null, thereby to protect the smoothing capacitor 4 and the inverter 5.

In the prior-art control apparatus for the elevator, however, the power control device 20 sets the slip s conforming to the aforementioned equation (5) on the basis of the predictive values of the primary resistance $r_1$ and secondary resistance $r_2$ of the induction motor. This had led to the problem that the values of these resistances fail to agree with the initial predictive values on account of the temperature rise of the induction motor, so the regenerative power cannot be held null at all times.

SUMMARY OF THE INVENTION

This invention has been made in order to solve such a problem, and has for its object to provide a control apparatus for an elevator by which regenerative power to a power source side can be reliably controlled to zero even when the temperature of an induction motor has risen.

The control apparatus for an elevator according to this invention consists in that regenerative power detection means to detect the regenerative power of an induction motor which is fed back to a D.C. power source side is comprised, and that a circuit which generates an inverter control command is a regenerative braking mode controls the regenerative power of the induction motor on the basis of the speed signal of the induction motor and the output signal of the regenerative power detection means.

In this invention, whether or not the regenerative power to the D.C. power source side is null is detected by the regenerative power detection means, and a frequency command signal is changed so that this regenerative power may become null.

PREFERRED EMBODIMENT OF THE INVENTION

Figure 1:
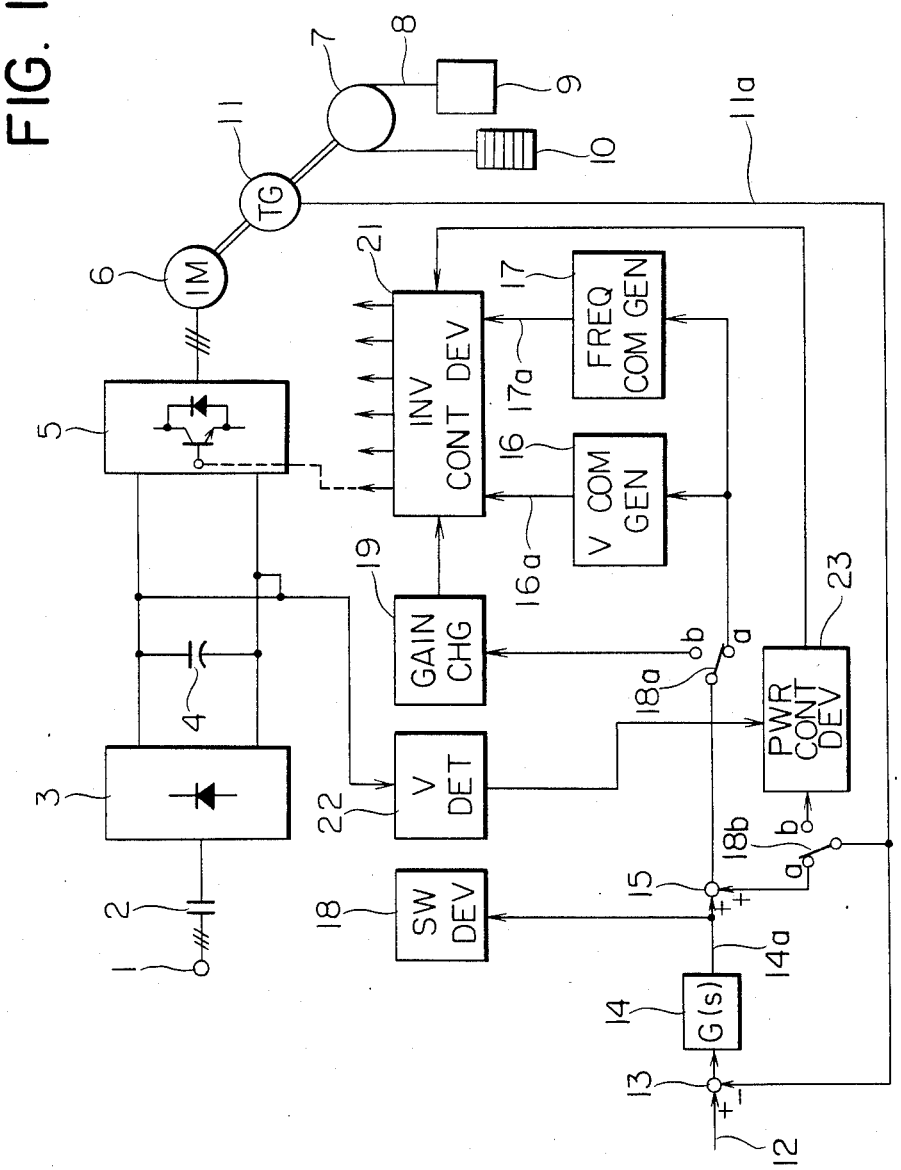
FIG. 1 is a block diagram showing the arrangement of an embodiment of the present invention.
Figure 2:
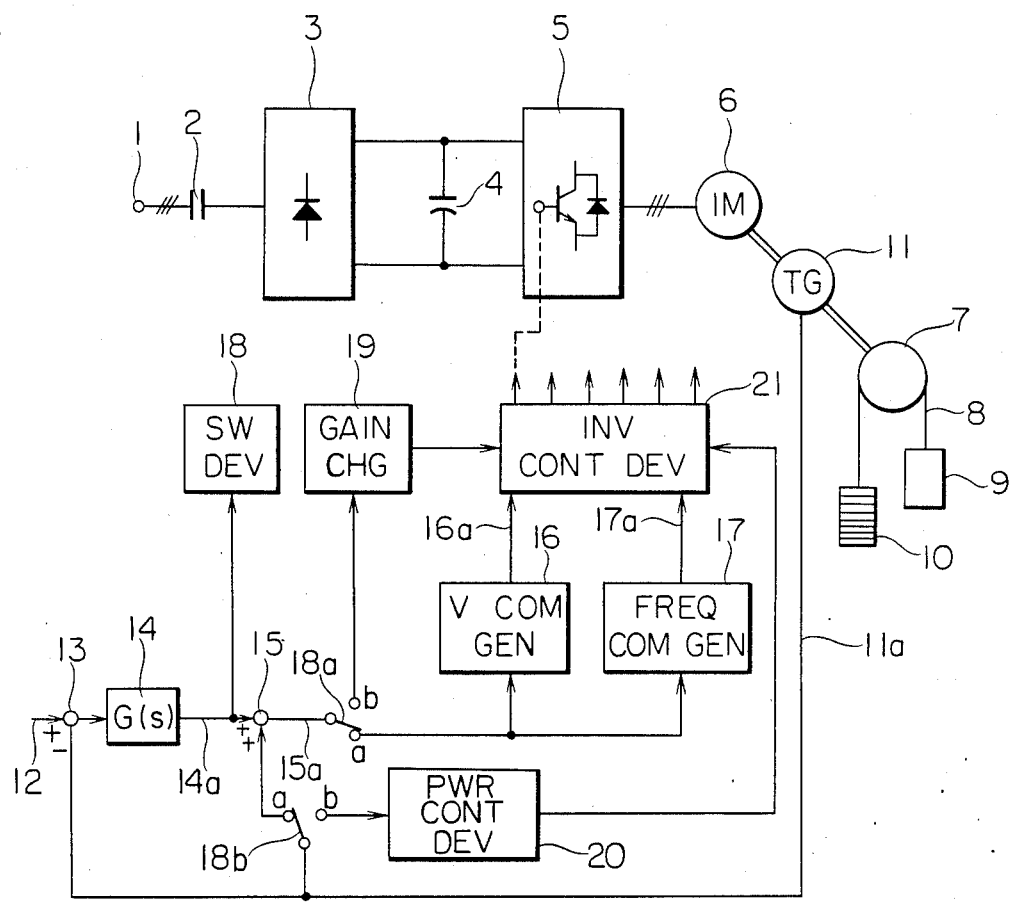
FIG. 2 is a block diagram showing the arrangement of a prior-art control apparatus for an elevator.
Figure 3:
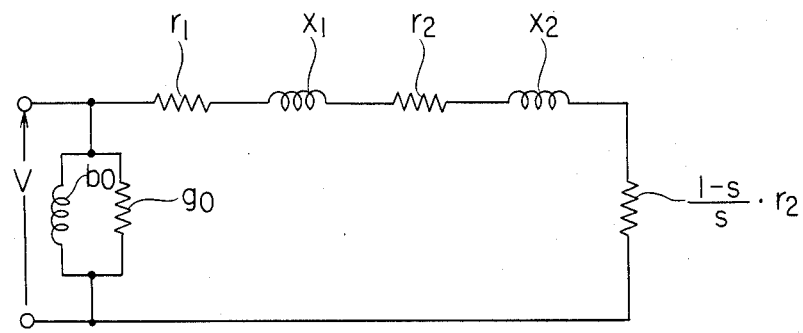
FIG. 3 is an equivalent circuit diagram of an induction motor for explaining the operation of the prior-art apparatus.

FIG. 1 is a block diagram showing one embodiment of this invention, in which numerals 1–19 and 21 indicate quite the same portions as in the prior-art apparatus described above. Numeral 22 indicates a voltage detector which is provided as regenerative power detection means to detect regenerative power that is fed from the induction motor 6 back to the D.C. power source side, and which detects the terminal voltage of the smoothing capacitor 4. A power control device 23 is connected to the contact b with which the contact piece 18b is switchedly brought into touch, and when the speed signal 11a is applied thereto, it generates a frequency command signal with which the regenerative power to be regenerated from the induction motor 6 to the D.C. side becomes null, on the basis of the output of the voltage detector 22.

Now, the operation of this embodiment will be described principally on points different from the prior-art apparatus.

First, in the power control device 23, the slip s which incurs no exchange of electric power between the induction motor 6 and the inverter 5 is set in correspondence with the primary resistance $r_1$ and secondary resistance $r_2$ of the induction motor 6 in the ordinary operation. When supplied with the speed signal 11a, the power control device 23 applies the frequency command signal to the inverter control device 21 as explained in the prior-art apparatus.

In this case, when the motor 6 has been operated continuously for a long period of time, the primary resistance $r_1$ and the secondary resistance $r_2$ change due to the rise of the temperature of the motor, and especially the secondary resistance $r_2$ changes greatly. For this reason, the slip s with which the regenerative power becomes null decreases as compared with the initially set value (approaches zero), and the regenerative power does not become null, with the result that the terminal voltage of the smoothing capacitor 4 rises.

When, to cope with this, the slip s is set beforehand so as to make the regenerative power sufficiently low in consideration of the fluctuating components of the primary resistance $r_1$ and the secondary resistance $r_2$, energy is inevitably supplied to the motor 6 in spite of the regenerative state of this motor 6. Accordingly, an inverter of large capacity capable of complying with the increase of motor current is required.

In this embodiment, therefore, the terminal voltage of the smoothing capacitor 4 is detected by the voltage detector 22, and when it has risen due to the regenerative power to the D.C. power source side, the power control device 23 diminishes the slip s in succession, whereby the regenerative power is suppressed to zero.

Figure 4:
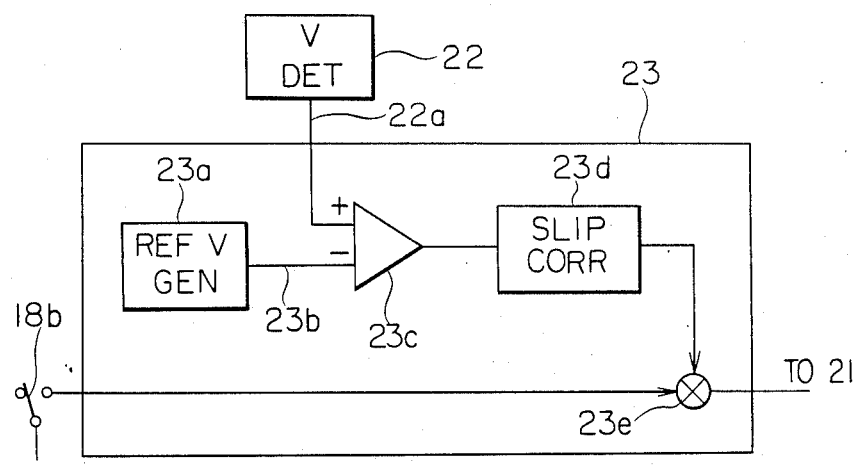
FIG. 4 is a block diagram showing the arrangement of a power control device in this invention.

Next, the arrangement of the power conrol device 23 will be described with reference to FIG. 4. In the figure, symbol 23a denotes a reference voltage generator which generates a signal 23b indicative of the terminal voltage of the smoothing capacitor 4 during the stop of the inverter 5. A comparator 23c compares the output signal 22a of the voltage detector 22 with the reference voltage signal 23b. It generates a plus signal when the output signal 22a is greater, that is, when the regenerative power from the motor 6 is being fed back to the D.C. power source side, whereas it generates a minus signal when the signal 22a is smaller. A slip corrector 23d calculates a coefficient for evaluating a synchronous frequency command for the motor 6 after correcting the slip s of the motor in accordance with the sign of the output of the comparator 23c. A multiplier 23e multiplies the speed signal 11a by the above coefficient and generates the frequency command for the motor.

The slip corrector 23d will now be described in detail.

When the slip frequency command signal 14a is minus, the slip s of the motor 6 is given as indicated by Eq. (5) mentioned before:

$$s = -\frac{r_2}{r_1 + g_0 Z^2} \quad (5')$$

In addition, the rotational frequency $f_r$ and synchronous frequency $f_0$ of the motor have the following relation:

$$f_0 = \frac{P}{1-s} f_r \quad (6)$$

where

P: number of pairs of poles.

The slip corrector 23d produces as an initial value the following coefficient of Eq. (6) which is evaluated from the slip s calculated according to Eq. (5') with the predicted values of the primary resistance $r_1$ and the secondary resistance $r_2$ (this slip is expressed as s*):

$$k = \frac{P}{1-s^*}$$

Now, if regenerative power is fed back to the D.C. side due to the temperature rise of the motor or the setting errors of the resistances (at this time, the output of the comparator 23c becomes plus), the slip of the motor given by Eq. (5') needs to be corrected to change the coefficient k of Eq. (6). In the above case, the slip s must be made smaller than the initially set value s* (∴ |s*| must be enlarged), and the coefficient k must be made smaller.

More specifically, when the output of the comparator 23c is plus, the slip corrector 23d performs the operation of decreasing the coefficient k of Eq. (6) until the output of the comparator 23c becomes minus (that is, until the feedback of the regenerative power to the D.C. side stops). To the contrary, when the output of the comparator 23c is minus, the slip corrector 23d operates to increase the coefficient k gradually. However, the operation of the gradual increase is stopped when the initial value is exceeded, and a value greater than the initial value is not output at any time.

The coefficient k calculated by the slip corrector 23d is input to the multiplier 23e, which multiplies this coefficient and the speed signal 11a to provide the frequency command signal.

The above operations of the slip corrector 23d make it possible to provide an apparatus in which even when the resistance values of the motor 6 have changed, the voltage of the smoothing capacitor 4 is hardly raised.

The power control device 23 is not restricted to the arrangement described above, but by way of example it may well be so contrived that the calculated results of the slip s are respectively stored beforehand for the predictive values of the primary resistance $r_1$ and the secondary resistance $r_2$ and that an appropriate frequency command signal is delivered in accordance with the output of the voltage detector 22.

While, in this embodiment, the voltage detector 22 for detecting the terminal voltage of the smoothing capacitor 4 had been provided in order to detect the regeneration of electric power to the D.C. power source side, it may well be replaced with a current detector which detects current flowing through the smoothing capacitor. Essentially, regenerative power detection means to detect electric power regenerated to the D.C. power side may be disposed.

As understood from the avove description, according to the present invention, regenerative power detection means to detect electric power regenerated to a D.C. power side is disposed, and a circuit which generates an inverter control command in a regenerative braking mode controls the regenerative power on the basis of the speed signal of an induction motor and the output signal of the regenerative power detection means. This brings forth the effect that, even when the temperature of the induction motor has risen, the regenerative power to the power source side can be reliably controlled to zero.

What is claimed is:

1. In a control apparatus for an elevator wherein an inverter is connected to a D.C. power source to change D.C. power into A.C. power, and an induction power is driven by the A.C. power so as to operate a cage; a control apparatus for an elevator comprising a first inverter control command generation portion which controls a torque of said induction motor with a slip frequency command signal that corresponds to a deviation between a speed command signal and a speed signal of said induction motor, regenerative power detection means to detect whether or not electric power which is regenerated from said induction motor to the D.C. power source side is null, a second inverter control command generation portion which delivers a slip frequency command of making null the electric power that is regenerated to said D.C. power source side, on the basis of an output signal of said regenerative power detection means and the speed signal, and a switching device which operates said first inverter control command generation portion when the slip frequency command signals is plus and which switches the operation to said second inverter control command generation portion when the slip frequency command signal is minus.

2. A control apparatus for an elevator as defined in claim 1, wherein said second inverter control command generation portion stores slips corresponding to predictive changes of a primary resistance and a secondary resistance of said induction motor, and it delivers a proper frequency command signal according to the output of said regenerative power detection means.

3. A control apparatus for an elevator as defined in claim 1, wherein said regenerative power detection means is a voltage detector which detects an output voltage of said D.C. power source.

4. A control apparatus for an elevator as defined in claim 1, wherein a capacitor for smoothing the output of said D.C. power source is disposed between said D.C. power source and said inverter, and said regenerative power detection means detects a voltage of said capacitor, thereby to detect whether or not the regenerative power is null.

5. A control apparatus for an elevator as defined in claim 1, wherein said second inverter control command generation portion changes the slip frequency command to be smaller in succession and then delivers it as the regenerative power detected by said regenerative power detection means rises more.

* * * * *